United States Patent
Kunert

[19]

[11] Patent Number: 6,023,237
[45] Date of Patent: Feb. 8, 2000

[54] METHOD AND DEVICE FOR MEASURING THE DISTANCE BETWEEN AN OBJECT AND AN APPARATUS FOR MEASURING SAID DISTANCE

[75] Inventor: Martin Kunert, Geisling, Germany

[73] Assignee: Siemens Automotive S.A., Toulouse-Cedex, France

[21] Appl. No.: 09/194,032

[22] PCT Filed: Apr. 25, 1997

[86] PCT No.: PCT/EP97/02156

§ 371 Date: Nov. 16, 1998

§ 102(e) Date: Nov. 16, 1998

[87] PCT Pub. No.: WO97/43663

PCT Pub. Date: Nov. 20, 1997

[30] Foreign Application Priority Data

May 14, 1996 [FR] France ................................. 96 05999

[51] Int. Cl.[7] .................................................. G01S 13/32
[52] U.S. Cl. ............................. 342/118; 342/128; 342/70
[58] Field of Search ................................ 342/70, 71, 72, 342/118, 128, 129, 134, 135

[56] References Cited

U.S. PATENT DOCUMENTS

| | | | |
|---|---|---|---|
| 3,680,085 | 7/1972 | Del Signore | 342/128 |
| 5,189,426 | 2/1993 | Asbury et al. | 342/70 |
| 5,400,032 | 3/1995 | Asbury et al. | 342/70 |

FOREIGN PATENT DOCUMENTS

3917794A1  10/1990  Germany .
4403190c1  7/1995  Germany .

OTHER PUBLICATIONS

"Performance analysis and optimization of vehicular spread spectrum radar using multi–beam antenna ", Hanada, Y.; Kohno, R, Intelligent Transportation System, 1997. ITSC '97., IEE Conference on , 1997 , pp. 661–666.

"Vehicular spread spectrum radar using multi–beam antenna", Hanada, Y.; Kohno, R., Vehicular Technology Conference, 1997, IEEE 47th vol. 1, 1997, pp. 116–120 vol. 1.

"Millimeter–wave dual mode radar for headway control in IVHS", Konno, K.; Koshikawa, S., Microwave Symposium Digest, 1997., IEEE MTT–S International vol. 3, 1997 , pp. 1261–1264 vol. 3.

*Primary Examiner*—John B. Sotomayor
*Attorney, Agent, or Firm*—Herbert L. Lerner; Laurence A. Greenberg

[57] ABSTRACT

The measurement apparatus (1) delivers both a raw measurement d(i) of the distance and a raw measurement v(i) of the relative speed of said object with respect to the apparatus (1). According to the invention, said speed measurement v(i) is integrated over a predetermined sliding time interval, the difference of the raw distance measurement d(i) and of the integral d'(i) of the speed is formed, a mean value ($C_{dif}$) of said difference is calculated over said time interval and the calculated mean (Copt) is added to the integral d'(i) of the speed to form a filtered measurement ($d_{filt}$) of the object/measurement apparatus distance.

5 Claims, 1 Drawing Sheet

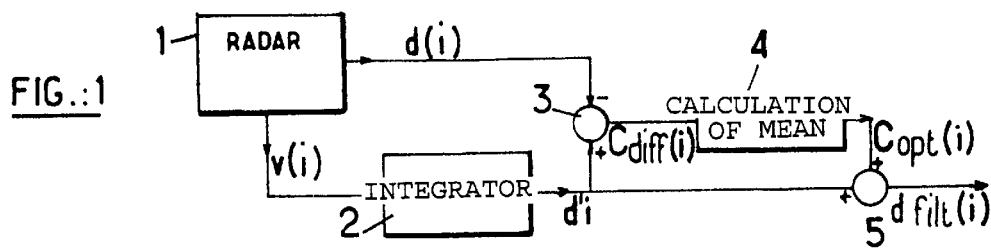
FIG.:1
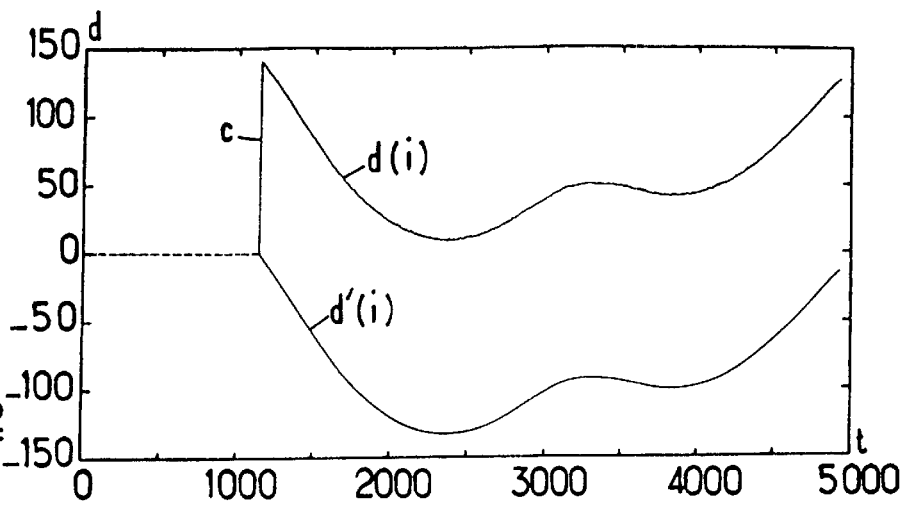
FIG.:2
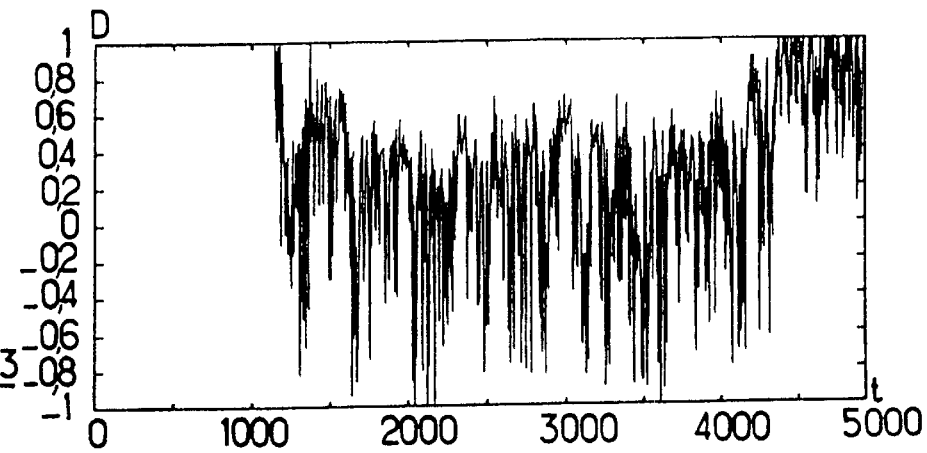
FIG.:3
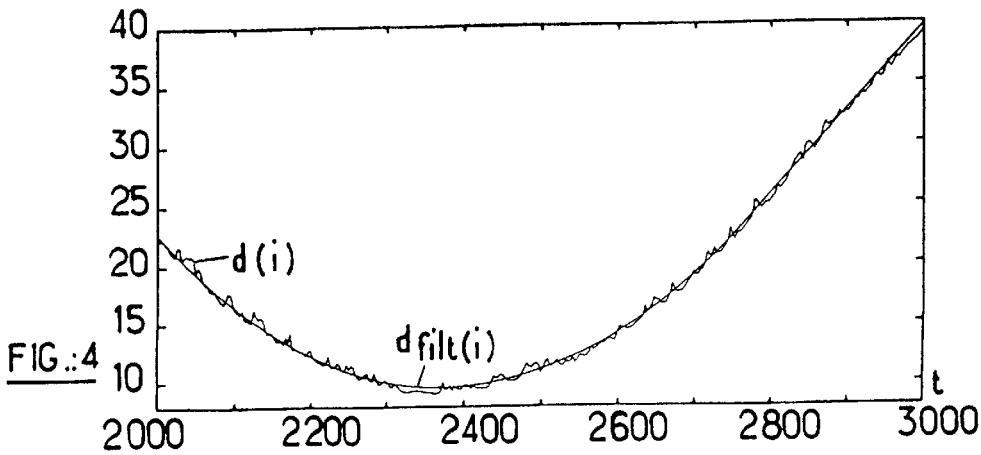
FIG.:4

METHOD AND DEVICE FOR MEASURING THE DISTANCE BETWEEN AN OBJECT AND AN APPARATUS FOR MEASURING SAID DISTANCE

BACKGROUND OF THE INVENTION

1. Field of the Invention

The present invention relates to a process for measuring the distance of an object with respect to an apparatus for measuring this distance and, more particularly, to such a process implemented with a measurement apparatus delivering both a raw measurement of said distance and a raw measurement of the relative speed of said object with respect to the apparatus. The invention also relates to a device for implementing this process.

2. Description of the Related Art

There is known, for example from the book entitled "Introduction to radar systems" by M. I. Skolnik, published in 1962 in the USA by McGraw-Hill, pages 86 et seq., a periodically frequency-modulated continuous-wave radar, more commonly known as an FMCW radar, for measuring the distance and the relative speed of an object. The employing of such a radar for measuring distances and speeds of motor vehicles is also known from German Patent Application DE-A-40 40 572. According to the process employed in the prior art, a carrier frequency is modulated by a triangular signal for example, this modulated signal is emitted continuously and a fraction of this signal is mixed with the signal reflected by the object whose distance and speed are to be measured. Two beat frequencies are thus obtained, corresponding respectively to the rising ramp and to the falling ramp of the signal for modulating the signal emitted. Following each period of modulation, the distance and the speed are derived from the mean and from the difference respectively of the beat frequencies. The raw values of distance and of speed thus obtained are marred by near-gaussian background noise. This background noise introduces an error into the values supplied, of the order of a meter with regard to distances for example. Such an error cannot be regarded as negligible in certain applications, especially when the radar forms part of an anticollision device with which a motor vehicle is equipped. The distance measurements delivered by the radar are therefore filtered so as to rid them of the inaccuracy due to the background noise. The filtering is preferably carried out with the aid of linear adaptive filters of the "Kalman" type, which are based on the discrepancies between a physical system and a model defined by its state variables. Such filters are described for example in the work entitled "Le filtrage et ses applications" [Filtering and its applications], published by Cepadues 1987, authors: M. Labarrere, J. P. Krief, B. Gimonet. Kalman filters are preferred since they scarcely affect the signal processed. On the other hand, they have the drawback of requiring a large amount of calculating power owing to their complexity.

SUMMARY OF THE INVENTION:

The aim of the present invention is to provide a process and a device for measuring the distance of an object with respect to an apparatus for measuring this distance, which make it possible to obtain an accurate measurement of said distance, without resorting to complex and hence expensive filtering of the raw distance signal delivered by the radar.

This aim of the invention is achieved, as are others which will emerge on reading the description which follows, with a process for measuring the distance of an object with respect to a measurement apparatus delivering both a raw measurement of said distance and a raw measurement of the relative speed of said object with respect to the apparatus, this process being noteworthy in that said speed measurement is integrated over a predetermined sliding time interval, the difference of the raw distance measurement and of the integral of the speed is formed, the mean of said difference is calculated over said time interval and the calculated mean is added to the intergrated speed to form a filtered measurement of the distance.

As will be seen later, the integration of the speed carried out according to the invention ensures simultaneous and automatic filtering of the speed measurement delivered by the measurement apparatus, while the calculation of the mean also ensures filtering, these two intrinsic filterings making it possible to dispense with expensive specific filtering means whilst allowing the delivery of an accurate measurement of the distance.

Other characteristics and advantages of the present invention will emerge on reading the description which follows and on examining the appended drawing in which:

BRIEF DESCRIPTION OF THE DRAWINGS:

FIG. 1 is a functional diagram of a device for implementing the process according to the invention, and FIGS. 2 to 4 are graphs which are useful in describing the process according to the invention.

DESCRIPTION OF THE PREFERRED EMBODIMENT

Reference is made to FIG. 1 of the appended drawing in which the device depicted comprises conventionally, by way of nonlimiting illustrative example, a measurement apparatus 1 consisting, for example, of a radar of the FMCW type mentioned above. In the anticollision application likewise mentioned above, the carrier frequency of such a radar is commonly 77 GHz. The radar conventionally delivers current samples $d(i)$ and $v(i)$ (i being the index of the sample) of measurements of the distance and of the relative speed, respectively, of an object moving with respect to the radar, the sampling period Tm (or measurement period) typically being of the order of 60 ms. As seen above, these measurements, and especially the distance measurement $d(i)$, are impaired by a large inaccuracy due to noise of gaussian origin, to the point that this raw distance measurement cannot easily be used when accuracy of better than a meter is desired, as is the case when dealing with a radar on board a motor vehicle for preventing any collision between this vehicle and other vehicles or other obstacles present in its path.

According to the invention, a measurement of the distance, of improved accuracy, is derived from integrating the speed measurement $v(i)$ supplied by the radar and from evaluating the difference between the value of this integral and the raw distance measurement $d(i)$ supplied by the radar, in such a way as to estimate the value of the integration constant.

This constant C appears in the expression which classically links the distance d and the speed v of a mobile:

$$d = \int v\,dt + C$$

In FIG. 2, depicting the profile over time (the unit of time being the measurement period Tm) of the raw measurement $d(i)$ supplied by the radar and the integral $d'(i)$ of the speed, this constant C appears as representing the vertical distance, at any instant t, between the two graphs.

FIG. 1 is returned to in order to describe the calculation, according to the invention, of said integration constant. The samples v(i) of the speed measurement made by the radar are supplied to an integrator 2 which supplies an output signal:

$$d'(i) = \sum_{i=0}^{k} v(i) \cdot \Delta t$$

the integration then being carried out at each instant over a sliding sampling of k consecutive samples supplied at the measurement rate of the radar, of period $\Delta t = Tm$.

In FIG. 3 one calculates the difference:

$$C_{dif} = d'(i) - d(i)$$

of the signal d'(i) and of the signal d(i) delivered by the radar at the same measurement rate.

The mean of this difference is calculated over k samples in a block 4 which delivers a sampled and optimized value of the desired constant such that:

$$C_{opt}(i) = \frac{1}{K+1} \sum_{i=0}^{k} C_{dif}(i)$$

and this value is added at 5 to the signal d'(i) delivered by the integrator 2 so as to form the measurement signal for the desired filtered distance dfilt:

$$d_{filt}(i) = d'(i) + C_{opt}(i)$$

It is observed that, in these operations, the near-gaussian background noise impairing the measurement signal v(i) for the speed supplied by the radar is filtered during its processing in the integrator 2, owing to the zero mean value of this gaussian noise. This noise is displayed in FIG. 3 of the appended drawing in which the graph depicted is that of the difference D (in meters) between the integrated speed added to the constant $C_{opt}$, and the raw distance measured by the radar, impaired by this noise, with a variance of around 80 cm².

Likewise, the noise impairing the measurement signal d(i) is eliminated from the constant $C_{opt}(i)$ through the effect of the mean computed in the block 4. Thus, according to the invention, all the components of the signal dfilt(i) which is delivered by the device of FIG. 1 undergo intrinsic filtering suitable for ridding them of the noise components which impair the accuracy of the raw measurements delivered by the radar. The signal $d_{filt}(i)$ thus gives a filtered measurement of the object/radar distance. This filtering appears in FIG. 4 which depicts a portion of the graphs of d(i) and of $d_{filt}(i)$ with amplification of the distance scale. The accuracy of $d_{filt}$ is thereby improved, and without resorting to expensive specific filtering means.

Of course, the invention is not limited to the embodiment described and depicted and which has been given merely by way of example. Thus, the measurement apparatus used may also consist of a pulsed Doppler radar and, more generally, of any apparatus capable of supplying measurements of the distance and of the relative speed of an object.

I claim:

1. A process of measuring a distance of an object from a measurement apparatus, which comprises:

delivering, with a measurement apparatus, a raw measurement d(i) of a distance and a raw measurement v(i) of a relative speed between an object and the measurement apparatus;

integrating the speed measurement v(i) over a predetermined sliding time interval to form a speed integral d'(i);

forming a difference between the raw measurement d(i) of the distance and the speed integral d'(i);

calculating a mean value of the difference over the time interval and adding the mean to the speed integral d'(i) to form a filtered measurement of the distance between the object and the measurement apparatus.

2. A device for measuring a distance from an object, comprising:

a measurement apparatus adapted to deliver a raw measurement d(i) of a distance between an object and said apparatus and a raw measurement v(i) of a relative speed of the object with respect to said apparatus;

an integrator connected to said apparatus and receiving from said apparatus a raw speed signal v(i);

a block connected to said integrator for calculating a mean $C_{opt}(i)$ of a difference between the raw distance measurement d(i) and an output d'(i) of said integrator; and a filter connected to said block and said integrator for forming a filtered measurement (d_hd filt) of the distance between the object and said apparatus by adding the mean $C_{opt}(i)$ to an output of said integrator.

3. The device according to claim 2, wherein said measurement apparatus is a frequency-modulated continuous-wave radar.

4. The device according to claim 2, wherein said measurement apparatus is a pulsed Doppler radar.

5. A method of measuring a distance of a motor vehicle from an obstacle in a path of the motor vehicle, which comprises measuring the distance between the obstacle and the motor vehicle with a device according to claim 2.

* * * * *

UNITED STATES PATENT AND TRADEMARK OFFICE
CERTIFICATE OF CORRECTION

PATENT NO : 6,023,237
DATED : February 8, 2000
INVENTOR(S) : Martin Kunert

It is certified that error appears in the above-identified patent and that said Letters Patent are hereby corrected as shown below:

Col. 3, line 13, "In Fig. 3" should read -- In block 3 --; and col. 4, line 40, after "filtered measurement" cancel "(d_hd filt)."

Signed and Sealed this

Twenty-fourth Day of April, 2001

Attest:

NICHOLAS P. GODICI

Attesting Officer

Acting Director of the United States Patent and Trademark Office